United States Patent
Kaushal et al.

(10) Patent No.: US 11,522,749 B2
(45) Date of Patent: Dec. 6, 2022

(54) DETECTING COMMUNICATION PATHWAYS AFFECTED BY SESSION FLAPS

(71) Applicant: Cisco Technology, Inc., San Jose, CA (US)

(72) Inventors: Vandana Kaushal, New Delhi (IN); Raghu R. Arur, New Delhi (IN); Rachana A. Soni, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 147 days.

(21) Appl. No.: 17/146,307

(22) Filed: Jan. 11, 2021

(65) Prior Publication Data

US 2022/0224592 A1   Jul. 14, 2022

(51) Int. Cl.
*H04L 12/28*    (2006.01)
*H04L 12/66*    (2006.01)
*H04L 41/0654*  (2022.01)
*H04L 45/748*   (2022.01)

(52) U.S. Cl.
CPC ........ *H04L 41/0654* (2013.01); *H04L 45/748* (2013.01)

(58) Field of Classification Search
None
See application file for complete search history.

(56) References Cited

U.S. PATENT DOCUMENTS

| | | | |
|---|---|---|---|
| 7,945,658 B1 | 5/2011 | Nucci et al. | |
| 9,729,414 B1 | 8/2017 | Oliveira et al. | |
| 10,623,322 B1 * | 4/2020 | Nallamothu | H04L 45/64 |
| 2007/0058568 A1 * | 3/2007 | Previdi | H04L 45/50 370/254 |
| 2012/0290716 A1 | 11/2012 | Ogielski et al. | |
| 2017/0257290 A1 | 9/2017 | Ogielski et al. | |
| 2019/0149415 A1 | 5/2019 | Pani et al. | |
| 2019/0149457 A1 | 5/2019 | Perrett et al. | |
| 2019/0394081 A1 * | 12/2019 | Tahhan | H04L 41/0893 |

(Continued)

FOREIGN PATENT DOCUMENTS

WO    2020063392 A1    4/2020

OTHER PUBLICATIONS

Intentionet, "Batfish An Open Source Network Configuration Analysis Tool" [Accessed Online Jan. 11, 2021].

(Continued)

*Primary Examiner* — Sai Aung
(74) *Attorney, Agent, or Firm* — Patterson + Sheridan, LLP

(57) ABSTRACT

A method that includes retrieving a first list of routing prefixes learned by a border node in a first network fabric and retrieving a second list comprising addresses of nodes in a second network fabric. The method also includes generating a dependency mapping based on the routing prefixes in the first list and the addresses in the second list. The dependency mapping indicates that network traffic to the addresses of the nodes in the second network fabric is affected by the border node in the first network fabric. The method further includes, in response to detecting that the border node in the first network fabric has malfunctioned and based on the dependency mapping, generating an alert indicating that network traffic to the addresses of the nodes in the second network fabric is affected by the border node in the first network fabric malfunctioning.

20 Claims, 4 Drawing Sheets

(56) References Cited

U.S. PATENT DOCUMENTS

| | | | | |
|---|---|---|---|---|
| 2020/0162343 | A1* | 5/2020 | Salam | H04L 43/20 |
| 2020/0169503 | A1 | 5/2020 | Tubaltsev et al. | |
| 2020/0296028 | A1* | 9/2020 | Nainar | H04L 45/54 |
| 2020/0344146 | A1* | 10/2020 | Roberts | H04L 45/02 |
| 2020/0403861 | A1* | 12/2020 | Saad | H04L 61/5007 |
| 2021/0385149 | A1* | 12/2021 | Suryanarayana | H04L 45/64 |
| 2021/0385155 | A1* | 12/2021 | Suryanarayana | H04L 45/64 |

OTHER PUBLICATIONS

Soon Tee Teoh et al: "BGP eye", Proceedings of the 3rd International Workshop on Visualization for Computer Security, ACM, 2 PENN Plaza, Suite 701 New York NY 10121-0701 USA, Nov. 3, 2006 (Nov. 3, 2006), pp. 81-90.
PCT, Notification of Transmittal of The International Search Report and The Written Opinion of The International Searching Authority, or The Declaration for Application PCT/US2022/070138 dated Apr. 25, 2022.

* cited by examiner

DETECTING COMMUNICATION PATHWAYS AFFECTED BY SESSION FLAPS

TECHNICAL FIELD

Embodiments presented in this disclosure generally relate to network communications. More specifically, embodiments disclosed herein relate to detecting communication pathways between different network fabrics affected by session flaps.

BACKGROUND

Devices in different network fabrics establish communication pathways with each other through border nodes in the fabrics. These border nodes are responsible for establishing and maintaining the communication pathways between the fabrics and for routing incoming and outgoing packets to their destinations.

When a border node malfunctions, communication involving the nodes within the border node's network fabric may become disrupted. It is difficult, however, to determine the impact of this disruption. For example, network traces can be run to determine the impact of the disruption, but the traces are unreliable when the border node handled a significant amount of network traffic.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a method that includes retrieving a first list of routing prefixes learned by a border node in a first network fabric and retrieving a second list comprising addresses of nodes in a second network fabric. The method also includes generating a dependency mapping based on the routing prefixes in the first list and the addresses in the second list. The dependency mapping indicates that network traffic to the addresses of the nodes in the second network fabric is affected by the border node in the first network fabric. The method further includes, in response to detecting that the border node in the first network fabric has malfunctioned and based on the dependency mapping, generating an alert indicating that network traffic to the addresses of the nodes in the second network fabric is affected by the border node in the first network fabric malfunctioning.

EXAMPLE EMBODIMENTS

This disclosure contemplates a flap monitor that determines and monitors the communication pathways between different network fabrics. The flap monitor retrieves, from the border nodes in the fabrics, lists of prefixes learned by those border nodes and lists of addresses of nodes in the fabrics. The flap monitor analyzes these lists to create a dependency mapping that maps the learned prefixes in a border node to the addresses of nodes in other network fabrics. When the flap monitor detects that a border node has malfunctioned (e.g., prefixes for the network fabric of that border node are unlearned by other border nodes in other network fabrics), the flap monitor references the dependency mapping to determine the addresses of nodes that are impacted by the malfunction. The flap monitor may then generate an alert that indicates the impacted nodes. In this manner, the flap monitor determines the network nodes that are impacted by the malfunction without running a trace, in certain embodiments.

Figure 1:
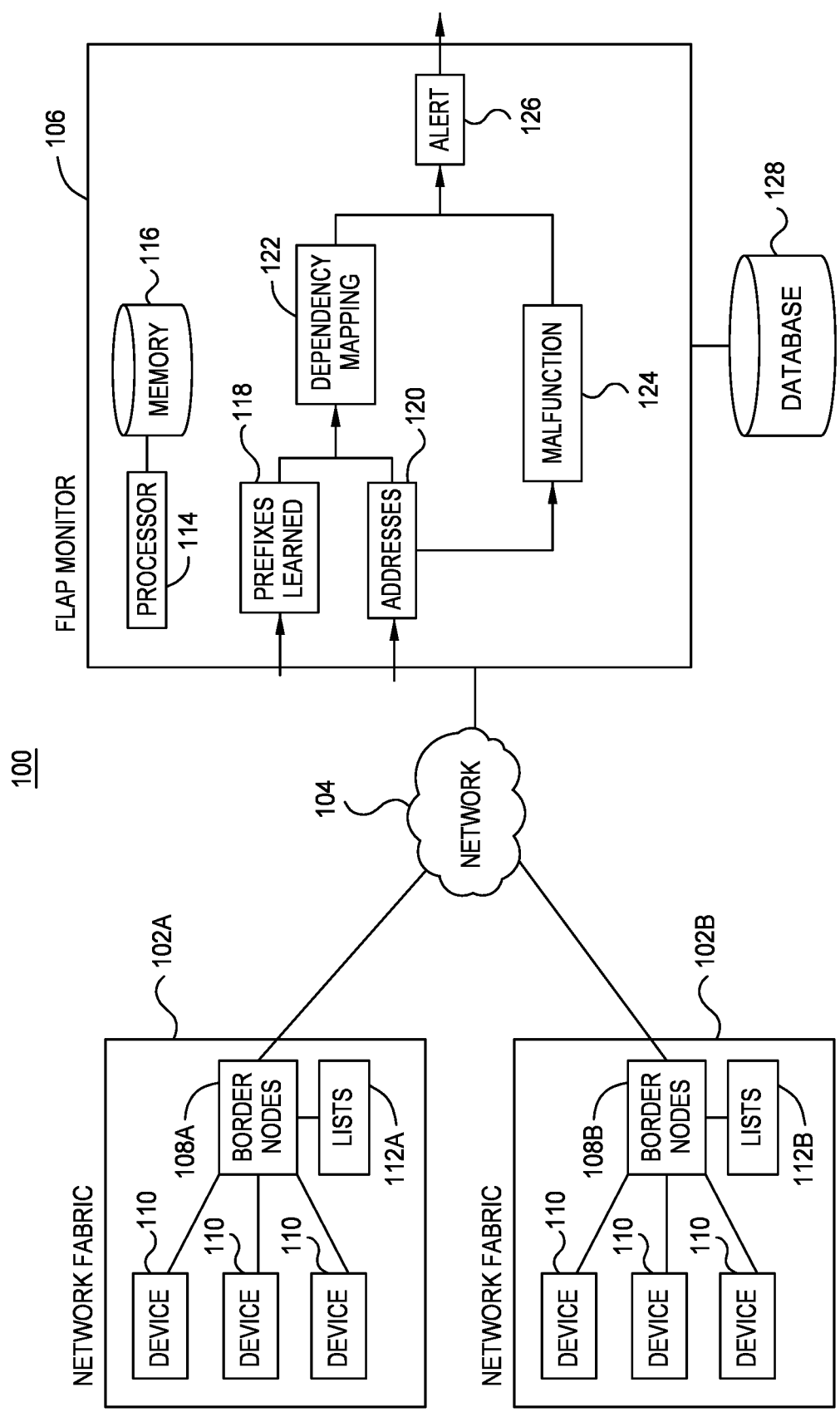
FIG. 1 illustrates an example system.

FIG. 1 illustrates an example system 100. As seen in FIG. 1, the system 100 includes one more network fabrics 102, a network 104, and a flap monitor 106. Generally, the flap monitor 106 monitors and assesses the communication pathways between the network fabrics 102. In particular embodiments, the flap monitor 106 can determine the communication pathways that are disrupted when a border node of a network fabric 102 malfunctions without running a trace.

The system 100 includes any suitable number of network fabrics 102. For clarity, the example of FIG. 1 includes network fabric 102A and network fabric 102B. Each network fabric 102 includes one or more border nodes 108. The border nodes 108 may be any suitable device that implements a level three network protocol (e.g., the border gateway protocol) to exchange routing information. The border nodes 108 are responsible for establishing and maintaining communication pathways between the network fabrics 102. The border nodes 108 also route incoming and outgoing packets to their destinations. The network fabric 102A includes one or more border nodes 108A. The network fabric 102B includes one or more border nodes 108B.

The network fabrics 102 also include one or more devices 110 communicatively coupled to one or more border nodes 108. The devices 110 may be any suitable device to communicate with other components of the system 100. For example, a device 110 may be a server, a switch, a router, a hub, or a user device. A device 110 may communicate packets to other components in the system 100. The device 110 may also receive packets from other components in the system 100. Communication to or from a device 110 travels through a border node 108 of the network fabric 102 of the device 110. Thus, when a border node 108 malfunctions, communication to or from a device 110 communicatively coupled to that border node 108 is disrupted.

A device 110 may execute an application that communicates with other components of the system 100. For example, the application may provide services to other devices 110 in other network fabrics 102. As another example, the application may consume services provided by other devices 110 in other network fabrics 102.

The device 110 may be a computer, a laptop, a wireless or cellular telephone, an electronic notebook, a personal digital assistant, a tablet, or any other device capable of receiving, processing, storing, or communicating information with other components of the system 100. The device 110 may be a wearable device such as a virtual reality or augmented reality headset, a smart watch, or smart glasses. The device 110 may also include a user interface, such as a display, a microphone, keypad, or other appropriate terminal equipment usable by the user 102. The device 110 may include a hardware processor, memory, or circuitry configured to perform any of the functions or actions of the device 110 described herein. For example, a software application designed using software code may be stored in the memory and executed by the processor to perform the functions of the device 110.

The border nodes 108 maintain one or more lists 112 that include certain information known by the border nodes 108. Specifically, the border nodes 108A maintain one or more lists 112A and the border nodes 108B maintain one or more lists 112B. For example, a border node 108 may maintain a list of the addresses of nodes within the same network fabric 102 as the border node 108. In the example of FIG. 1, the border node 108A may maintain a list 112A that identifies the addresses of the devices 110 in the network fabric 102A. The border node 108B may maintain a list 112B of the devices 110 in the network fabric 102B. Additionally, the border nodes 108 may maintain a list of address prefixes learned by the border node 108 when establishing communication pathways with the border nodes 108 of other network fabrics 102. In the example of FIG. 1, the border node 108A may maintain a list 112A of address prefixes in the network fabric 102B. The border node 108B may maintain a list 112B of address prefixes in the network fabric 102A.

The network 104 is any suitable network operable to facilitate communication between the components of the system 100. The network 104 may include any interconnecting system capable of transmitting audio, video, signals, data, messages, or any combination of the preceding. The network 104 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The flap monitor 106 monitors and assesses the communication pathways between the network fabrics 102. As seen in FIG. 1, the flap monitor 106 includes a processor 114 and a memory 116, which are configured to perform any of the functions or actions of the flap monitor 106 described herein. In particular embodiments, the flap monitor 106 can determine the communication impact caused by a border node 108 malfunction without running a trace.

The processor 114 is any electronic circuitry, including, but not limited to microprocessors, application specific integrated circuits (ASIC), application specific instruction set processor (ASIP), and/or state machines, that communicatively couples to memory 116 and controls the operation of the flap monitor 106. The processor 114 may be 8-bit, 16-bit, 32-bit, 64-bit or of any other suitable architecture. The processor 114 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 114 may include other hardware that operates software to control and process information. The processor 114 executes software stored on memory to perform any of the functions described herein. The processor 114 controls the operation and administration of the flap monitor 106 by processing information (e.g., information received from the border nodes 108, network 104, and memory 116). The processor 114 may be a programmable logic device, a microcontroller, a microprocessor, any suitable processing device, or any suitable combination of the preceding. The processor 114 is not limited to a single processing device and may encompass multiple processing devices.

The memory 116 may store, either permanently or temporarily, data, operational software, or other information for the processor 114. The memory 116 may include any one or a combination of volatile or non-volatile local or remote devices suitable for storing information. For example, the memory 116 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 116, a disk, a CD, or a flash drive. In particular embodiments, the software may include an application executable by the processor 114 to perform one or more of the functions described herein.

The flap monitor 106 retrieves the lists 112 from the border nodes 108 to determine the communication pathways between the network fabrics 102. For example, the flap monitor 106 may retrieve lists 112 from the border nodes 108 that identify the address prefixes 118 learned by those border nodes 108. Additionally, the flap monitor 106 may retrieve lists 112 from the border nodes 108 that identify the addresses 120 of the nodes within the network fabrics 102. The addresses 120 may include the addresses of the devices 110 within the network fabrics 102. The flap monitor 106 generates a dependency mapping 122 using the prefixes 118 learned and the addresses 120. The network fabric 102 maps the prefixes 118 learned to the addresses 120 that contain those prefixes 118. As a result, these mappings represent the communication pathways from a border node 108 to the devices 110 in other network fabrics 102. In particular embodiments, the flap monitor 106 also adds application names to the addresses 120 in the dependency mapping 122. The application names indicate the applications that are executed by the devices 110 that have those addresses 120. The flap monitor 106 may use a domain name system or service to determine the names of the applications. When a border node 108 malfunctions, the flap monitor 106 may refer to the dependency mapping 122, to determine the communication pathways that are disrupted.

The flap monitor 106 may determine the malfunction 124 of a border node 108 using the prefixes 118 learned. For example, the flap monitor 106 may determine that a border node 108 has malfunctioned when another border node 108 in a different network fabric 102 unlearns the prefixes 118 of the malfunctioning border node 108. Using the example of FIG. 1, the flap monitor 106 may determine that the border node 108A has malfunctioned when the border node 108B removes prefixes 118 of the network fabric 102A (i.e., the network that contains the border node 108A) from its list 112B of prefixes 118 learned. The border node 108B may have removed these prefixes 118 in response to the border node 108B experiencing communication failures with the devices 110 or the border node 108A in the network fabric 102A.

Any number of issues may cause a border node 108 to malfunction. For example, a border node 108 may malfunction because of high processor or memory utilization in the border node 108. As another example, a border 108 may malfunction because the border node 108 is oversubscribed. As yet another example, a border node 108 may malfunction because the border node 108 may drop incoming or outgoing packets.

When the flap monitor 106 determines the malfunction 124, the flap monitor 106 may refer to the dependency mapping 122 to determine the addresses 120 that are impacted by the malfunction 124. For example, the flap monitor 106 may determine the prefixes 118 that were unlearned by a border node 108. The flap monitor 106 may then refer to the dependency mapping 122 to determine the addresses 120 that were mapped to the unlearned prefix 118. These addresses 120 belong to the nodes (e.g., devices 110) of the network fabric 102 that are impacted by the malfunction 124. Using the example of FIG. 1, if the flap monitor 106 determines that the border node 108B has unlearned prefixes 118 from the network fabric 102A, the flap monitor 106 may determine that the border node 108A has malfunctioned. In response, the flap monitor 106 refers to the dependency mapping 122 to determine the addresses 120 of the devices 110 in the network fabric 102A mapped to the unlearned prefixes 118.

The flap monitor 106 generates an alert 126 that indicates the malfunction 124 and the addresses 120 of the nodes impacted by the malfunction 124. In certain embodiments, the flap monitor 106 may also include in the alert 126 the names of applications executed by the impacted nodes. In this manner, the alert 126 contains information that identifies the communication pathways, devices 110, and applications that are impacted by the malfunction 124 of the border node 108.

The flap monitor 106 may communicate the alert 126 to an administrator so that corrective action can be taken to restore the communication pathways to the impacted nodes. For example, the administrator may move the impacted nodes to other network fabrics 102. As another example, if the malfunctioning border node 108 cannot be restored, the administrator may reroute the impacted nodes through another border node 108 in the same network fabric 102. In certain embodiments, the flap monitor 106 may copy a configuration of the malfunctioning border node 108 to another border node 108 in the same network fabric 102. For example, if the flap monitor 106 determines that the border node 108A and the network fabric 102A is malfunctioning, the flap monitor 106 may copy the configuration of the malfunctioning border node 108A to another border node 108 within the network fabric 102A. The flap monitor 106 may copy the prefixes 118 learned by the malfunctioning border node 108A and the addresses 120 kept by the malfunctioning border node 108A to another border node 108 in the network fabric 102A. In this manner, the other border node 108 may assume the routing responsibilities of the malfunctioning border node 108A.

In certain embodiments, the flap monitor 106 stores the dependency mapping 122 in a database 128 external to the flap monitor 106. As the border nodes 108 update their lists 112 and as the flap monitor 106 receives those updates, the flap monitor 106 makes corresponding updates to the dependency mapping 122 within the database 128. When the flap monitor 106 determines the malfunction 124 (e.g., because a border node 108 removes certain prefixes 118 from its list 112), the flap monitor 106 may refer to the dependency mapping 122 stored in the database 128. In particular embodiments, other flap monitors 106 may refer to the dependency mapping 122 stored in the database 128.

Figure 2:
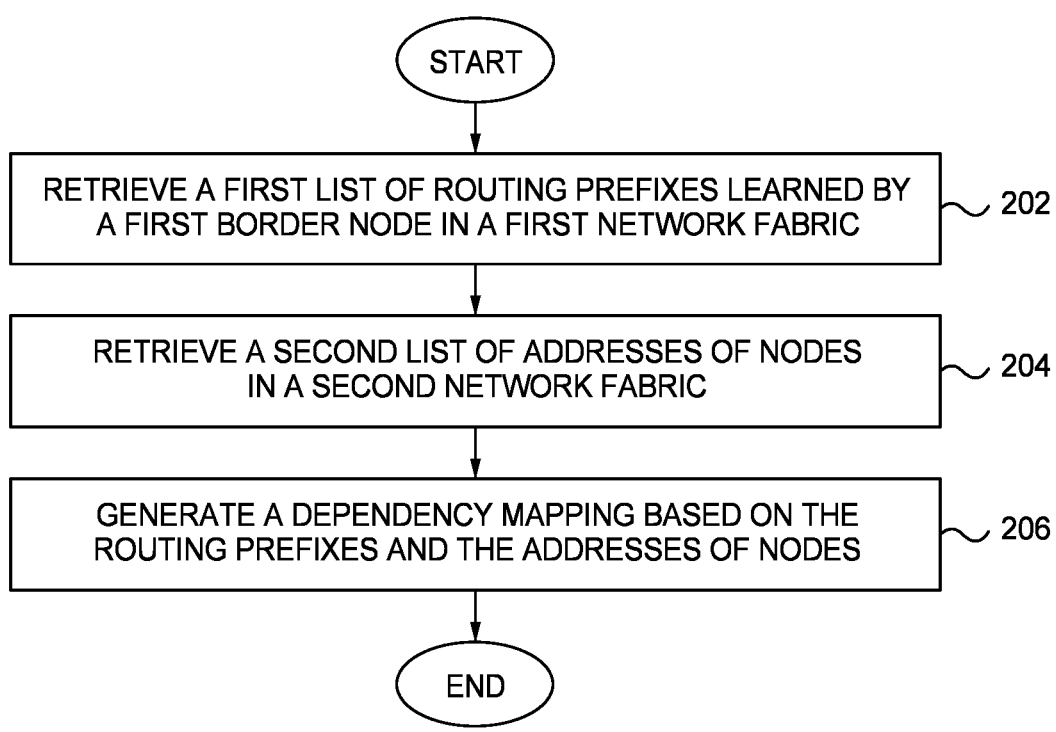
FIG. 2 is a flowchart of an example method in the system of FIG. 1.

FIG. 2 is a flowchart of an example method 200 in the system 100 of FIG. 1. The flap monitor 106 may perform the method 200. In particular embodiments, by performing the method 200, the flap monitor 106 generates a dependency mapping 122 that can be used to determine communication pathways impacted by a border node 108 malfunction without running a trace.

In block 202, the flap monitor 106 retrieves a first list of routing prefixes 118 learned by a first border node, (e.g., the border node 108A) in a first network fabric (e.g., the network fabric 102A). The border node 108A may have learned these routing prefixes 118 when routing packets to or from other network fabrics 102 (e.g., the network fabric 102B). The prefixes 118 may be used by the network fabric 102B to address nodes within the network fabric 102B. The border node 108A may maintain these prefixes 118 until the border node 108A experiences difficulty communicating with the network fabric 102B. When the border node 108A experiences difficulty communicating with the network fabric 102B, the border node 108A may remove or unlearn these prefixes 118. The border node 108A may maintain a list 112A that identifies these prefixes 118.

In block 204, the flap monitor 106 retrieves a second list 112 (e.g., the list 112B) of addresses 120 of nodes (e.g., devices 110 in the network fabric 102B). The list 112B may be maintained by a border node 108B in the network fabric 102B. The addresses 120 may be the network addresses of the devices 110 that are communicatively coupled to the border node 108B. The border node 108B may route packets to and from these devices 110. The border node 108B may update the list 112B when a device 110 connects or disconnects from the border node 108B. Thus, the addresses 120 represent the network addresses of the devices 110 in the network fabric 102B that are reachable by the border node 108B.

In block 206, the flap monitor 106 generates a dependency mapping 122 based on the routing prefixes 118 and the addresses 120 of nodes. The flap monitor 106 may determine the addresses 120 that include the routing prefixes 118. The flap monitor 106 may then map these addresses 120 to these routing prefixes 118 in the dependency mapping 122. In particular embodiments, the flap monitor 106 may also map the names of applications executed by the nodes identified by the addresses 120. The flap monitor 106 may use a domain name system to determine the names of these applications. The flap monitor 106 may store the dependency mapping 122 in a database 128. In particular embodiments, the flap monitor 106 may use the dependency mapping 122 when the flap monitor 106 determines that a border node 108 has malfunctioned.

Figure 3:
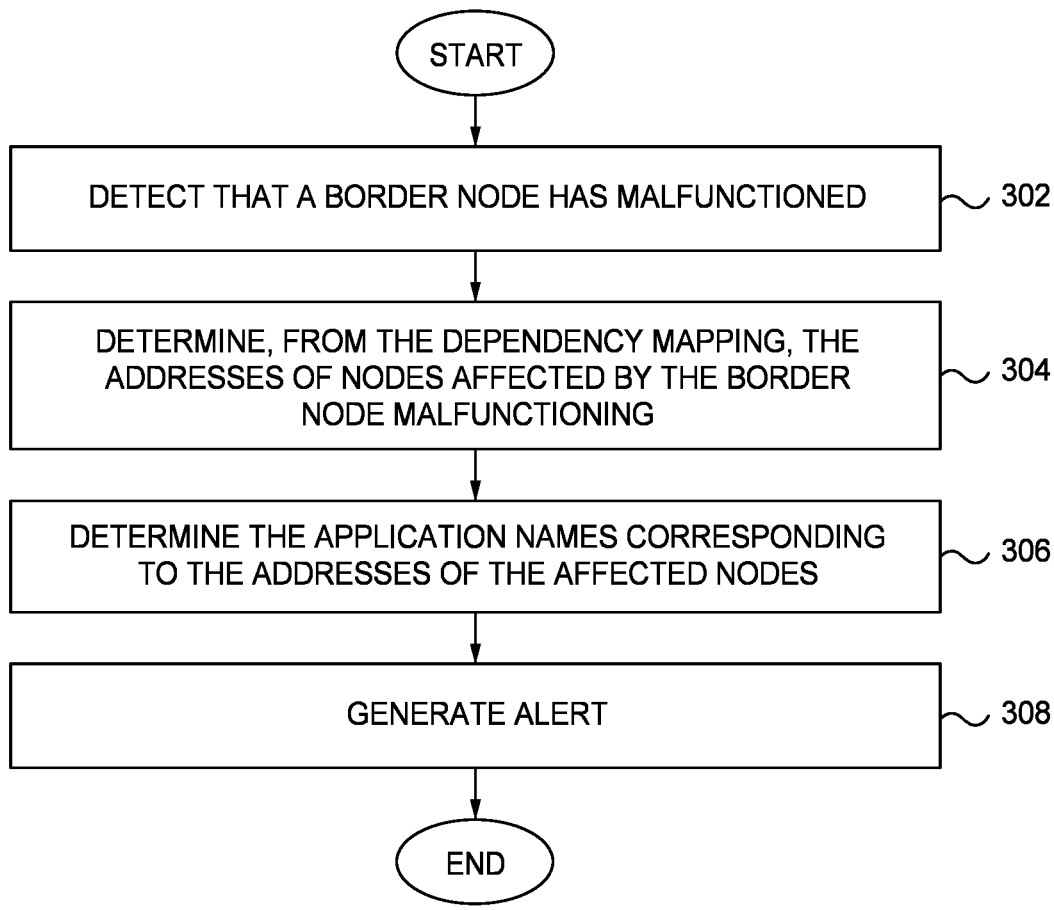
FIG. 3 is a flowchart of an example method in the system of FIG. 1.

FIG. 3 is a flowchart of an example method 300 in the system 100 of FIG. 1. The flap monitor 106 may perform the method 300. In particular embodiments, by performing the method 300, the flap monitor 106 determines the communication pathways impacted by a malfunctioning border node 108 without running a trace.

In block 302, the flap monitor 106 detects that a border node 108A has malfunctioned. In particular embodiments, the flap monitor 106 determines that the border node 108A has malfunctioned by analyzing prefixes 118 from a border node 108B in a different network fabric 102B. When the border node 108A malfunctions, the border node 108B may experience difficulty communicating with the border node 108A or other devices 110 in the network fabric 102A of the border node 108A. In response, the border node 108B may remove prefixes 118 for the border node 108A and the network fabric 102A from a list 112B maintained by the border node 108B. When the flap monitor 106 receives the updated list 112B from the border node 108B, the flap monitor 106 may determine that the border node 108B has unlearned the prefixes 118 for the border node 108A and the network fabric 102A. In response, the flap monitor 106 may determine that the border node 108A has malfunctioned.

In block 304, the flap monitor 106 determines from the dependency mapping 122 the addresses 120 of nodes affected by the border node 108A malfunctioning. The dependency mapping 122 may map addresses 120 to the prefixes 118. The addresses 120 mapped to a particular prefix 118 may be the addresses 120 that include that prefix 118. The addresses 120 mapped to the unlearned prefixes 118 may be the addresses 120 of the devices 110 in the network fabric 102A that the border node 108B can no longer reach because the border node 108A malfunctioned.

In block 306, the flap monitor 106 determines the application names corresponding to the addresses 120 of the affected nodes. In particular embodiments, the flap monitor 106 may determine these application names through the dependency mapping 122. For example, the flap monitor 106 may have determined these application names using a domain name system when generating the dependency mapping 122. The dependency mapping 122 may include the mapping of the prefixes 118 to the addresses 120 and the application names.

In block 308, the flap monitor 106 generates an alert 126 that includes information pertaining to the malfunctioning border node 108A. For example, the alert 126 may indicate the malfunctioning border node 108A. Additionally, the alert 126 may indicate the addresses 120 of the devices 110 in the network fabric 102A that are no longer reachable by the border node 108B due to the malfunctioning of border node 108A. Furthermore, the alert 126 may indicate the names of applications executed by these devices 110. The flap monitor 106 may communicate the alert 126 to an administrator to inform the administrator of the border node 108A and so that remedial action can be taken. For example, the flap monitor 106 may copy a configuration (e.g., prefixes 118 learned and addresses 120 of nodes) of the border node 108A to another border node 108 in the network fabric 102A so that the other border node 108 may perform the operations of the border node 108A. As another example, an administrator may move the devices 110 in the network fabric 102A that were communicatively coupled to the border node 108A to another network fabric 102. As yet another example, an administrator may restart or reboot the network node 108A.

Figure 4:
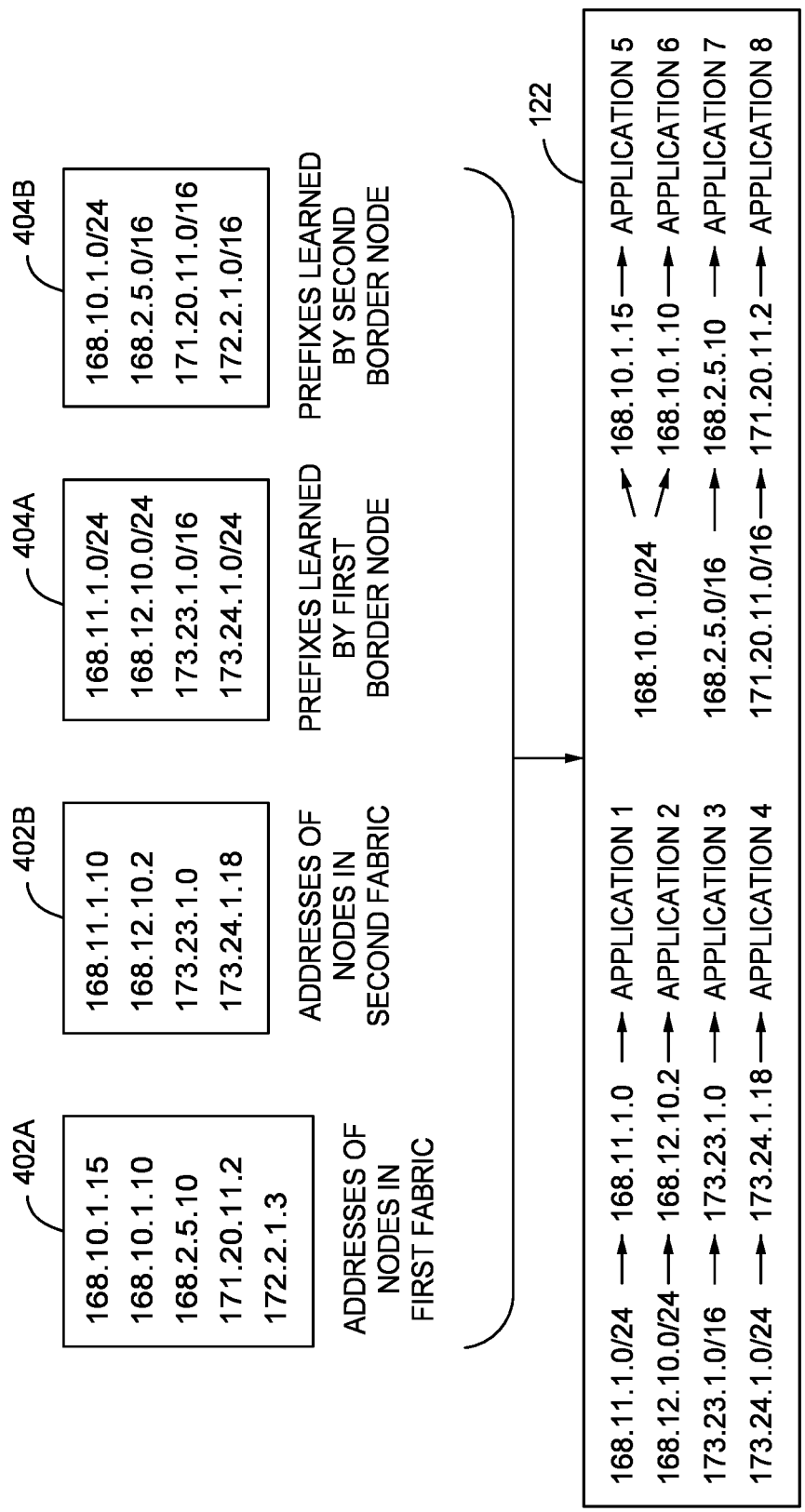
FIG. 4 illustrates an example dependency mapping in the system of FIG. 1.

FIG. 4 illustrates an example of dependency mapping 122 in the system 100 of FIG. 1. Generally, the flap monitor 106 generates the depending mapping 122 based on one or more lists 112 retrieved from the border nodes 108 of different network fabrics 102.

In the example of FIG. 4, the flap monitor 106 retrieves from the border node 108A addresses 402A of nodes in the first network fabric 102A. The addresses 402A are the network addresses of the devices 110 in the network fabric 102A. In the example of FIG. 4, the addresses 402A include 168.10.1.15, 168.10.1.10, 168.2.5.10, 171.20.11.2, and 172.2.1.3. The flap monitor 106 may likewise retrieve from the border node 108B the addresses 402B of the devices 110 in the network fabric 102B. In the example of FIG. 4, the addresses 402B include 168.11.1.10, 168.12.10.2, 173.23.1.0, and 173.24.1.18.

The flap monitor 106 may further retrieve from the border nodes 108 the prefixes 118 learned by those border nodes 108. These prefixes 118 may be the prefixes associated with other network fabrics 102 to or from which a border node 108 has communicated packets. In the example of FIG. 4, the flap monitor 106 retrieves the prefixes 404A from the border node 108A. The prefixes 404A represent the prefixes 118 learned by the border node 108A while communicating with the components of the network fabric 102B. The prefixes 404A include 168.11.1.0/24, 168.12.10.0/24, 173.23.1.0/16, and 173.24.1.0/24. Significantly, the addresses 402B from the border node 108B fall within the prefixes 404A. The flap monitor 106 also retrieves the prefixes 404B from the border node 108B. The prefixes 404B are learned by the border node 108B when communicating with components of the network fabric 102A. The prefixes 404B include 168.10.1.0/24, 168.2.5.0/16, 171.20.11.0/16, and 172.2.1.0/16. Importantly, the addresses 402A fall within the prefixes 404B.

The flap monitor 106 analyzes the addresses 402A and 402B and the prefixes 404A and 404B to generate the dependency mapping 122. As seen in FIG. 4, the dependency mapping 122 maps the prefixes 404A and 404B to the addresses 402A and 402B that contain those prefixes 404A and 404B. Specifically, the addresses 402A kept by the border node 108A are mapped to the prefixes 404B learned by the border node 108B. The addresses 402B kept by the border node 108B are mapped to the prefixes 404A learned by the border node 108A. As a result, these mappings represent the communication pathways between the network fabrics 102A and 102B.

In the dependency mapping 122, the prefix 168.11.1.0/24 is mapped to the address 168.11.1.0. The prefix 168.12.10.0/24 is mapped to the address 168.12.10.2. The prefix 173.23.1.0/16 is mapped to the address 173.23.1.0. The prefix 173.24.1.0/24 is mapped to the address 173.24.1.18. The prefix 168.10.1.0/24 is mapped to the addresses 168.10.1.15 and 168.10.1.10. The prefix 168.2.5.0/16 is mapped to the address 168.2.5.10. The prefix 171.20.11.0/16 is mapped to the address 171.20.11.2.

In particular embodiments, the flap monitor 106 prevents an entry of a prefix and address from being added to the depending mapping 122 based on the type of end nodes corresponding to the prefixes and addresses. For example, the flap monitor 106 may use flow telemetry data to determine which devices 110 corresponding to the addresses are provider devices (e.g., servers) and which devices 110 are consumer devices that consume outputs from provider devices. The flap monitor 106 may then prevent entries in the dependency mapping 122 that map consumer devices to other consumer devices or that map provider devices to other provider devices. In the example of FIG. 4, the flap monitor 106 may determine that the address 402A 172.2.1.3 is mapped to the same kind of device 110. For example, the flap monitor 106 may use flow telemetry data to determine that the address 172.2.1.3 is a consumer device that is mapped to another consumer device, or the flap monitor 106 may determine that the address 172.2.1.3 is a provider device that is mapped to another provider device. In response, the flap monitor 106 may prevent an entry in the dependency mapping 122 that maps the prefix 404B 172.2.1.0/16 to the address 404A 172.2.1.3. In this manner, the dependency mapping 122 includes only consumer-to-provider or provider-to-consumer mappings, which may simplify the analysis for the flap monitor 106 when referring to the dependency mapping 122 to assess the impact on communication pathways.

In certain embodiments, the flap monitor 106 adds to the dependent mapping 122 the names of applications executed by the devices 110 with the addresses in the dependency mapping 122. The flap monitor 106 may use a domain name system to determine the names of these applications. In the example of FIG. 4, the flap monitor 106 has added application names to the addresses within the dependency mapping 122. The address 168.11.1.0 is mapped to Application 1. The address 168.12.10.2 is mapped to Application 2. The address 173.23.1.0 is mapped to Application 3. The address 173.24.1.18 is mapped to Application 4. The address 168.10.1.15 is mapped to Application 5. The address 168.10.1.10 is mapped to Application 6. The address 168.2.5.10 is mapped to Application 7. The address 171.20.11.2 is mapped to Application 8. By adding the application names to the dependency mapping 122, the flap monitor 106 can refer to the dependency mapping 122 to determine the applications that may become reachable when a border node 108 malfunctions.

Add information from IDF.

Malfunction could be border being removed (intentionally or accidentally).

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
retrieving a first list of routing prefixes learned by a border node in a first network fabric;
retrieving a second list comprising addresses of nodes in a second network fabric;
generating a dependency mapping based on the routing prefixes in the first list and the addresses in the second list, the dependency mapping indicating that network traffic to the addresses of the nodes in the second network fabric is affected by the border node in the first network fabric; and
in response to detecting that the border node in the first network fabric has malfunctioned and based on the dependency mapping, generating an alert indicating that network traffic to the addresses of the nodes in the second network fabric is affected by the border node in the first network fabric malfunctioning.

2. The method of claim 1, further comprising copying a configuration of the border node, comprising the prefixes learned by the border node, to a second border node in the first network fabric in response to detecting that the border node has malfunctioned.

3. The method of claim 1, further comprising preventing an entry from being added to the dependency mapping based on a determination that the entry corresponds to a consumer-to-consumer mapping or a provider-to-provider mapping.

4. The method of claim 1, further comprising adding, to the dependency mapping, names of applications corresponding to the addresses of the nodes in the second network fabric.

5. The method of claim 1, wherein detecting that the border node in the first network fabric has malfunctioned comprises detecting that a routing prefix is removed from a list of routing prefixes learned by a border node in the second network fabric.

6. The method of claim 1, wherein the border node implements a level three network protocol.

7. The method of claim 1, wherein the border node in the first network fabric is configured to establish a route for the network traffic from the first network fabric to the addresses of the nodes in the second network fabric.

8. An apparatus comprising:
a memory; and
a hardware processor communicatively coupled to the memory, the hardware processor configured to:
retrieve a first list of routing prefixes learned by a border node in a first network fabric;
retrieve a second list comprising addresses of nodes in a second network fabric;
generate a dependency mapping based on the routing prefixes in the first list and the addresses in the second list, the dependency mapping indicating that network traffic to the addresses of the nodes in the second network fabric is affected by the border node in the first network fabric; and
in response to detecting that the border node in the first network fabric has malfunctioned and based on the dependency mapping, generate an alert indicating that network traffic to the addresses of the nodes in the second network fabric is affected by the border node in the first network fabric malfunctioning.

9. The apparatus of claim 8, the hardware processor further configured to copy a configuration of the border node, comprising the prefixes learned by the border node, to a second border node in the first network fabric in response to detecting that the border node has malfunctioned.

10. The apparatus of claim 8, the hardware processor further configured to prevent an entry from being added to the dependency mapping based on a determination that the entry corresponds to a consumer-to-consumer mapping or a provider-to-provider mapping.

11. The apparatus of claim 8, the hardware processor further configured to add, to the dependency mapping, names of applications corresponding to the addresses of the nodes in the second network fabric.

12. The apparatus of claim 8, wherein detecting that the border node in the first network fabric has malfunctioned comprises detecting that a routing prefix is removed from a list of routing prefixes learned by a border node in the second network fabric.

13. The apparatus of claim 8, wherein the border node implements a level three network protocol.

14. The apparatus of claim 8, wherein the border node in the first network fabric is configured to establish a route for the network traffic from the first network fabric to the addresses of the nodes in the second network fabric.

15. An apparatus comprising:
a memory; and
a hardware processor communicatively coupled to the memory, the hardware processor configured to:
retrieve a first list of routing prefixes learned by a border node in a first network fabric;
retrieve a second list comprising addresses of nodes in a second network fabric;
generate a dependency mapping based on the routing prefixes in the first list and the addresses in the second list, the dependency mapping comprising a mapping of a prefix in the first list to an address in the second list, wherein the address in the second list comprises the prefix in the first list; and
in response to detecting that the border node in the first network fabric has malfunctioned and based on the dependency mapping, generate an alert indicating that network traffic to the addresses of the nodes in the second network fabric is affected by the border node in the first network fabric malfunctioning.

16. The apparatus of claim 15, the hardware processor further configured to copy a configuration of the border node, comprising the prefixes learned by the border node, to a second border node in the first network fabric in response to detecting that the border node has malfunctioned.

17. The apparatus of claim 15, the hardware processor further configured to prevent an entry from being added to the dependency mapping based on a determination that the entry corresponds to a consumer-to-consumer mapping or a provider-to-provider mapping.

18. The apparatus of claim 15, the hardware processor further configured to add, to the dependency mapping, names of applications corresponding to the addresses of the nodes in the second network fabric.

19. The apparatus of claim 15, wherein detecting that the border node in the first network fabric has malfunctioned comprises detecting that a routing prefix is removed from a list of routing prefixes learned by a border node in the second network fabric.

20. The apparatus of claim 15, wherein the border node in the first network fabric is configured to establish a route for the network traffic from the first network fabric to the addresses of the nodes in the second network fabric.

\* \* \* \* \*